United States Patent
Hu et al.

(10) Patent No.: US 11,422,357 B2
(45) Date of Patent: Aug. 23, 2022

(54) OPTICAL SYSTEM

(71) Applicant: TDK TAIWAN CORP., Taoyuan (TW)

(72) Inventors: Chao-Chang Hu, Taoyuan (TW); Che-Wei Chang, Taoyuan (TW); Chih-Wen Chiang, Taoyuan (TW); Chen-Er Hsu, Taoyuan (TW); Fu-Yuan Wu, Taoyuan (TW); Shou-Jen Liu, Taoyuan (TW); Chih-Wei Weng, Taoyuan (TW); Mao-Kuo Hsu, Taoyuan (TW); Hsueh-Ju Lu, Taoyuan (TW); Che-Hsiang Chiu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 55 days.

(21) Appl. No.: 16/750,441

(22) Filed: Jan. 23, 2020

(65) Prior Publication Data
US 2021/0055539 A1 Feb. 25, 2021

Related U.S. Application Data

(60) Provisional application No. 62/894,295, filed on Aug. 30, 2019, provisional application No. 62/890,731, filed on Aug. 23, 2019.

(30) Foreign Application Priority Data

Dec. 20, 2019 (EP) ..................................... 19218902

(51) Int. Cl.
*G02B 26/00* (2006.01)
*G02B 3/12* (2006.01)

(52) U.S. Cl.
CPC ............. *G02B 26/004* (2013.01); *G02B 3/12* (2013.01)

(58) Field of Classification Search
CPC .......... G02B 26/004; G02B 3/12; G02B 7/08; G02B 27/646; G02B 3/14
See application file for complete search history.

(56) References Cited

U.S. PATENT DOCUMENTS

| | | |
|---|---|---|
| 2013/0039640 A1* | 2/2013 | Sekimoto ............. H04N 5/2328 396/55 |
| 2016/0231641 A1* | 8/2016 | Minamisawa ........ G02B 27/646 |
| 2018/0059381 A1* | 3/2018 | Sharma ..................... G02B 7/09 |

FOREIGN PATENT DOCUMENTS

EP 3907545 A1 * 7/2019 ............... G02B 3/14

* cited by examiner

Primary Examiner — Darryl J Collins
Assistant Examiner — Matthew Y Lee
(74) Attorney, Agent, or Firm — Muncy, Geissler, Olds & Lowe, P.C.

(57) ABSTRACT

An optical system is provided and includes a fixed assembly, a movable element and a driving module. The fixed assembly has a main axis. The movable element is movable relative to the fixed assembly, and the movable element is connected to a first optical element. The driving module is configured to drive the movable element to move relative to the fixed assembly.

19 Claims, 15 Drawing Sheets

OPTICAL SYSTEM

CROSS REFERENCE TO RELATED APPLICATIONS

This application claims the benefit of U.S. Provisional Application No. 62/890,731, filed Aug. 23, 2019, U.S. Provisional Application No. 62/894,295, filed Aug. 30, 2019, and European Patent Application No. 19218902.5, filed Dec. 20, 2019, the entirety of which are incorporated by reference herein.

BACKGROUND OF THE DISCLOSURE

Field of the Disclosure

The present disclosure relates to an optical system, and in particular it relates to an optical system having a liquid lens.

Description of the Related Art

As technology has progressed, many kinds of electronic devices such as smartphones have begun to include the functionality of digital photography or video recording. A user can operate an electronic device to capture various images with a camera module that is included in the electronic device.

The design trend of today's electronic devices is toward miniaturization, meaning that the various components of a camera module or its structure must also be continuously reduced, so as to achieve the purpose of miniaturization. In general, a driving mechanism in a camera module has a camera lens holder configured to hold a camera lens, and the driving mechanism can have the functions of auto focusing or optical image stabilization. However, although the existing driving mechanism can achieve the aforementioned functions of photographing or video recording, they still cannot meet all the needs of miniaturization.

Therefore, how to design a camera module that can perform autofocus, optical image stabilization, and miniaturization at the same time is a topic nowadays that needs to be discussed and solved.

BRIEF SUMMARY OF THE DISCLOSURE

Accordingly, one objective of the present disclosure is to provide an optical system (camera module) to solve the problems listed above.

According to some embodiments of the disclosure, an optical system is provided and includes a fixed assembly, a movable element and a driving module. The fixed assembly has a main axis. The movable element is movable relative to the fixed assembly, and the movable element is connected to a first optical element. The driving module is configured to drive the movable element to move relative to the fixed assembly.

According to some embodiments, the optical system further includes a movable assembly and a connecting assembly, the movable assembly is movably connected to the movable element via the connecting assembly, and the driving module drives the movable assembly to move relative to the fixed assembly so as to drive the movable element.

According to some embodiments, the connecting assembly includes a connecting member, the movable assembly is connected to the movable element by an elastic portion of the connecting member, and the connecting member further has a rigid portion connected to the elastic portion by an adhesive member, wherein a distance between a top surface of the movable element and the first optical element along the main axis is less than a distance between the adhesive member and the first optical element.

According to some embodiments, when viewed along the main axis, the connecting member extends outward from the movable element.

According to some embodiments, the connecting assembly includes a plurality of connecting members, and when viewed along the main axis, the connecting members are mirror-symmetric with respect to a first traverse axis or a second traverse axis.

According to some embodiments, each connecting member includes at least one string, extending along multiple directions which are perpendicular to the main axis.

According to some embodiments, when viewed along the main axis, both ends of the string are connected to the movable element.

According to some embodiments, the string includes a first cantilever and a second cantilever, and the first cantilever and the second cantilever are symmetrical with respect to the first traverse axis.

According to some embodiments, when viewed along the main axis, the string has a fixed width.

According to some embodiments, when viewed along the main axis, a surface of the first optical element partially overlaps at least one portion of the string.

According to some embodiments, when viewed along the main axis, a first portion of the surface is located in an inner side of a pressured surface of the first optical element, a second portion of the surface is located outside the pressured surface of the first optical element, and the string partially overlaps at least one portion of the second portion.

According to some embodiments, when viewed along the main axis, the string has a non-uniform width.

According to some embodiments, the string has a first end and a second end, and when viewed along the main axis, the first end is connected to the movable element, and the second end is connected to the rigid portion.

According to some embodiments, when viewed along the main axis, the connecting members are rotationally symmetric with respect to the main axis.

According to some embodiments, the string is connected to the movable element by an adhesive member.

According to some embodiments, the string and the movable element are made of metal material, and the movable element and the string are integrally formed in one piece.

According to some embodiments, the movable element is made of plastic material.

According to some embodiments, at least one positioning portion is formed on the movable element, and the positioning portion is configured to position the first end of the string.

According to some embodiments, the string is made of metal material and is embedded in the movable element by insert molding technology.

According to some embodiments, the rigid portion is mirror-symmetric with respect to the main axis.

The present disclosure provides an optical system having a first optical element, a deforming member, a movable element, a fixed assembly, a connecting assembly, a movable assembly, and a driving module. The movable element is configured to be connected to the first optical element through the deforming member, and the movable assembly is connected to the movable element through the connecting assembly. When driving module is configured to drive movable assembly to move relative to fixed assembly, the movable element can be moved to drive the deforming member to push the bottom of first optical element, thereby changing the optical properties of the liquid lens element.

In addition, in some embodiments, the string of the elastic portion can be designed to include two cantilever, and based on the design of this string, the stability of the movable assembly to drive the movable element via the connecting assembly can be increased.

Additional features and advantages of the disclosure will be set forth in the description that follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It should be noted that, in accordance with standard practice in the industry, various features are not drawn to scale. In fact, the dimensions of the various features may be arbitrarily increased or reduced for clarity of discussion.

DETAILED DESCRIPTION OF THE ILLUSTRATIVE EMBODIMENTS

Figure 1:
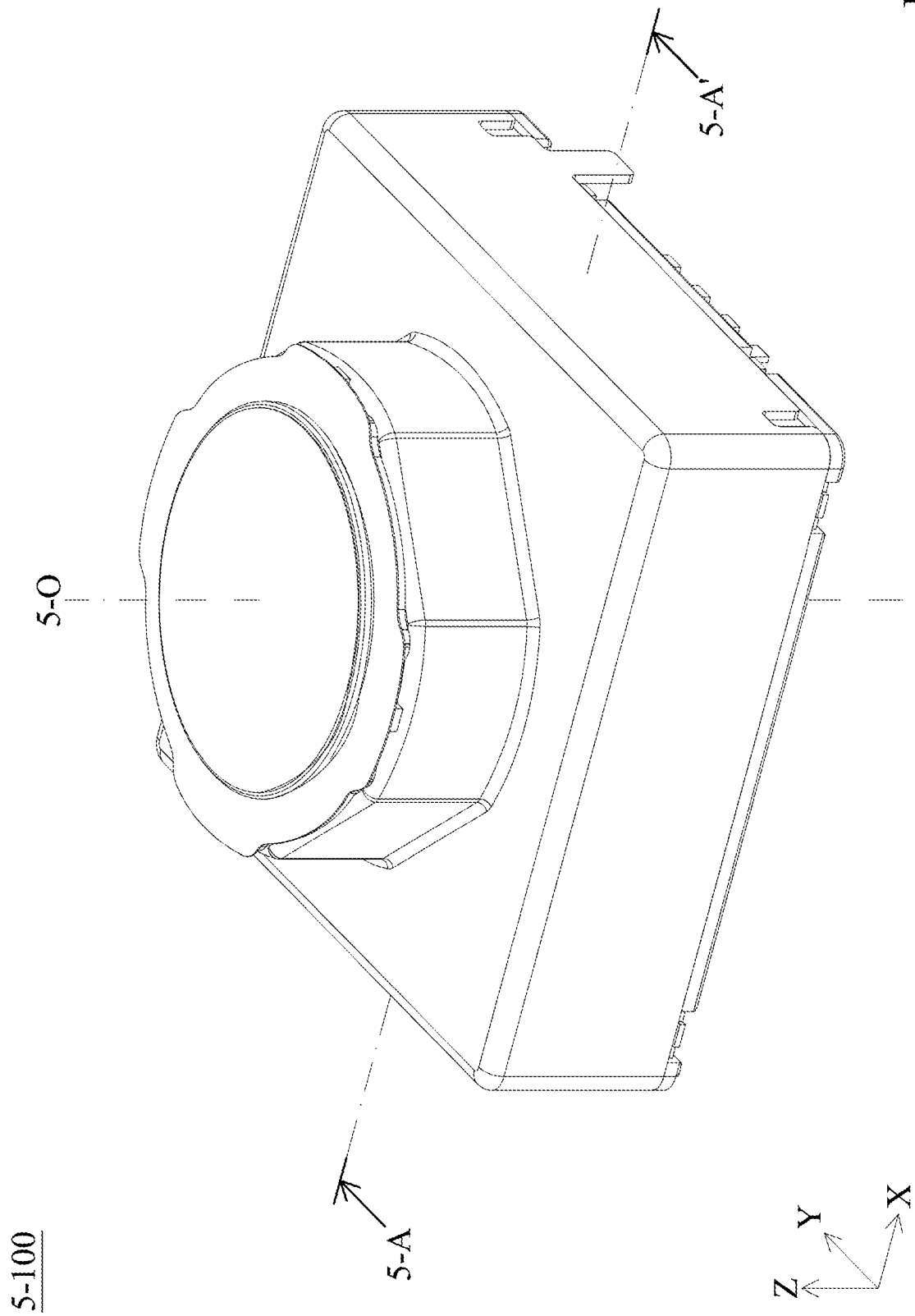
FIG. 1 is a schematic diagram of an optical system 5-100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/− 20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
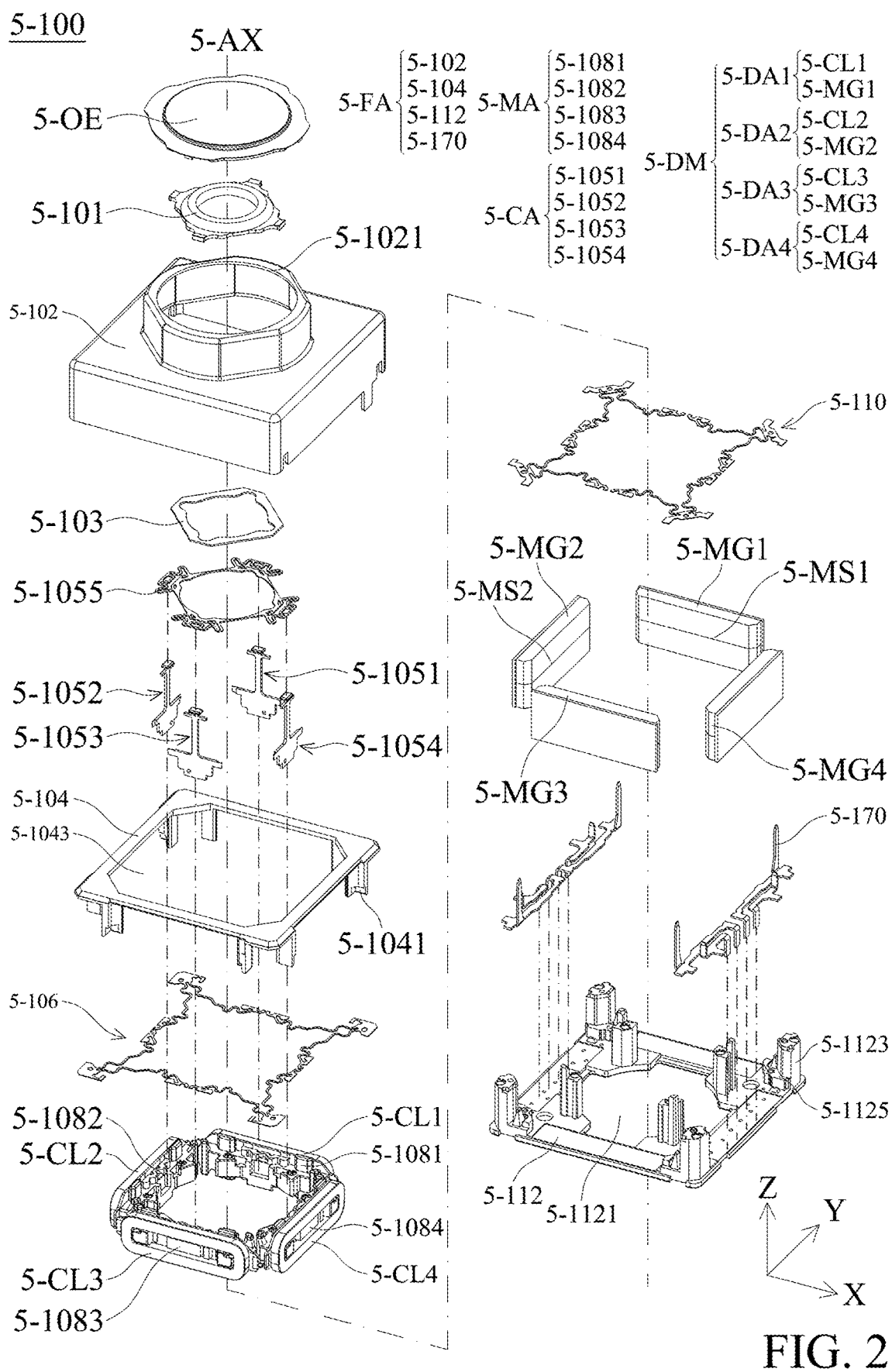
FIG. 2 is an exploded diagram of an optical system 5-100 according to an embodiment of the present disclosure.
Figure 3:
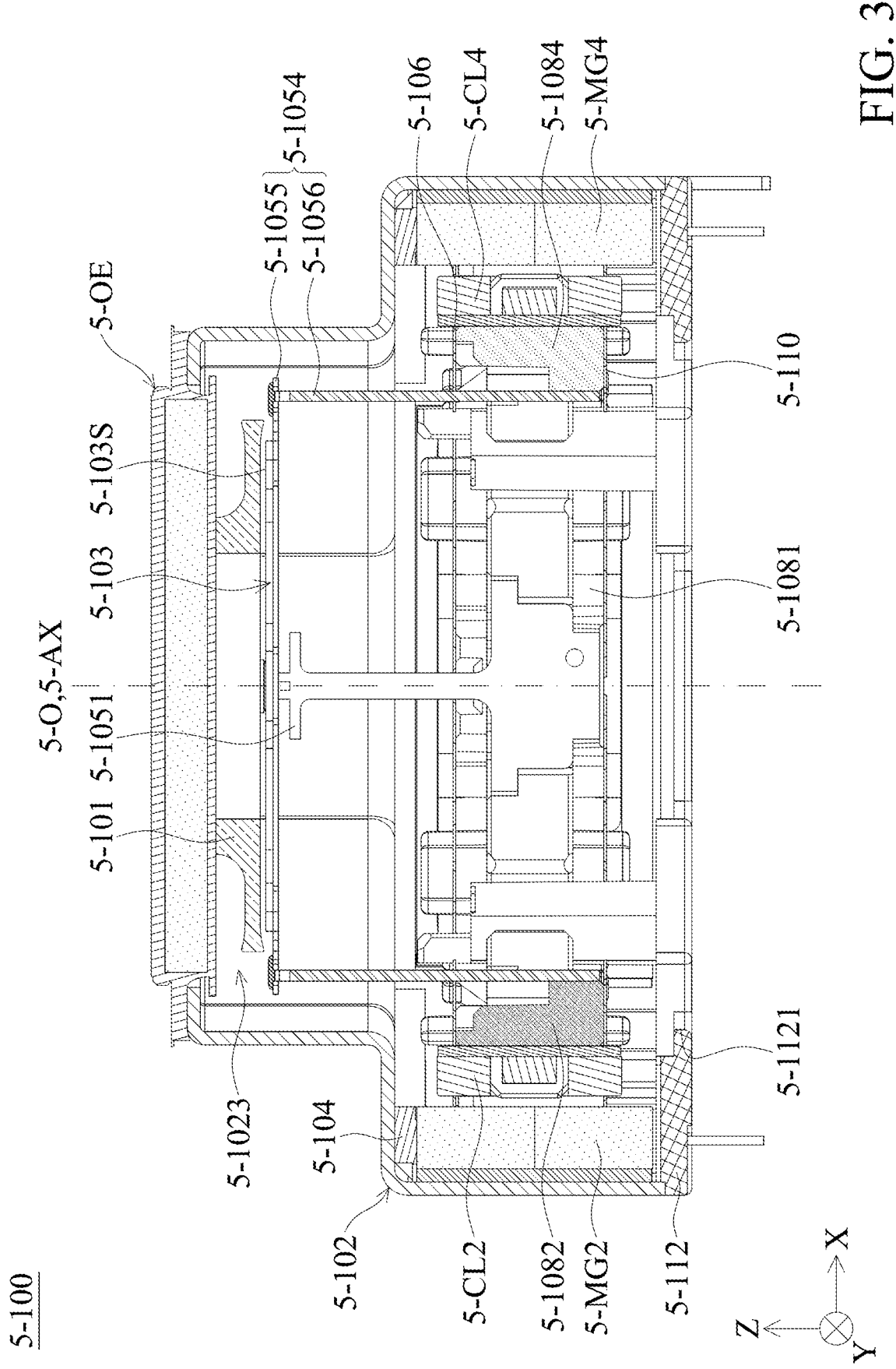
FIG. 3 is a cross-sectional view of the optical system 5-100 along line 5-A-5-A' in FIG. 1 according to an embodiment of the present disclosure.

Please refer to FIG. 1 to FIG. 3. FIG. 1 is a schematic diagram of an optical system 5-100 according to an embodiment of the present disclosure, FIG. 2 is an exploded diagram of an optical system 5-100 according to an embodiment of the present disclosure, and FIG. 3 is a cross-sectional view of the optical system 5-100 along line 5-A-5-A' in FIG. 1 according to an embodiment of the present disclosure. The optical system 5-100 can be an optical camera system and can be configured to hold and drive a first optical element 5-OE, and the first optical element 5-OE may define an optical axis 5-O. The optical system 5-100 can be installed in different electronic devices or portable electronic devices, such as a smartphone, for allowing a user to perform the image capturing function. In this embodiment, the optical system 5-100 can be a voice coil motor (VCM) with an auto-focusing (AF) function, but it is not limited thereto. In other embodiments, the optical system 5-100 can also perform the functions of auto-focusing and optical image stabilization (OIS).

As shown in FIG. 2, in this embodiment, the optical system 5-100 may include a fixed assembly 5-FA, a deforming member 5-101, a movable element 5-103, and a connecting assembly 5-CA, a movable assembly 5-MA and a driving module 5-DM. The deforming member 5-101 is connected between the movable element 5-103 and the first optical element 5-OE, the movable element 5-103 is movable relative to the fixed assembly 5-FA, and the driving module 5-DM is configured to drive the movable element 5-103 to move relative to the fixed assembly 5-FA. Specifically, the movable assembly 5-MA is movably connected to the movable element 5-103 via the connecting assembly 5-CA, and the driving module 5-DM drives the movable assembly 5-MA to move relative to the fixed assembly 5-FA, thereby driving the movable element 5-103.

In this embodiment, as shown in FIG. 2 and FIG. 3, the fixed assembly 5-FA includes a casing 5-102, a frame 5-104, and a base 5-112. The casing 5-102 is fixedly connected to the base 5-112, and the frame 5-104 can also be fixedly connected to the inner wall surface of the casing 5-102. A main axis 5-AX can be defined by the fixed assembly 5-FA. When the optical system 5-100 is not activated, the main axis 5-AX is parallel to or overlaps an optical axis 5-O of the first optical element 5-OE. In addition, the movable element 5-103 has a movable element surface 5-103S which faces the first optical element 5-OE.

As shown in FIG. 2 and FIG. 3, the aforementioned casing 5-102 has a hollow structure, and a casing opening 5-1021 is formed thereon. A base opening 5-1121 is formed on the base 5-112, The center of the casing opening 5-1021 corresponds to the optical axis 5-O of the first optical element 5-OE, and the base opening 5-1121 corresponds to a photosensitive element (not shown in the figure) disposed below the base 5-112. In this embodiment, the first optical element 5-OE is fixedly disposed in the casing opening 5-1021. The external light can enter the casing 5-102 through the first optical element 5-OE and then is received by the aforementioned photosensitive element after passing through the base opening 5-1121 so as to generate a digital image signal.

Furthermore, the casing 5-102 is disposed on the base 5-112 and may have an accommodating space 5-1023 configured to accommodate the movable element 5-103, the frame 5-104, and the movable assembly 5-MA, the connecting assembly 5-CA, and the driving module 5-DM.

As shown in FIG. 2 and FIG. 3, in this embodiment, the movable assembly 5-MA may include four movable members (a first movable member 5-1081, a second movable member 5-1082, and a third movable member 5-1083 and a fourth movable member 5-1084), and the connecting assembly 5-CA may include four connecting members (a first connecting member 5-1051, a second connecting member 5-1052, a third connecting member 5-1053, and a fourth connecting member 5-1054). The first movable member 5-1081 to the fourth movable member 5-1084 are connected to the movable element 5-103 by the first connecting member 5-1051 to the fourth connecting member 5-1054, respectively. Specifically, the first connecting member 5-1051 to the fourth connecting member 5-1054 may each include an elastic portion 5-1055 and a rigid portion 5-1056. The elastic portion 5-1055 is connected to the movable element 5-103, and the rigid portion 5-1056 is connected to the elastic portion 5-1055 by an adhesive member 5-AD. In addition, multiple elastic portions 5-1055 form an elastic sheet and collectively surround the main axis 5-AX, as shown in FIG. 2.

In addition, the optical system 5-100 may further include a first elastic element 5-106 and a second elastic element 5-110, and the base 5-112 may include four protruding columns 5-1123. The outer portion (the outer ring portion) of the first elastic element 5-106 is fixedly disposed on the top surfaces of the protruding columns 5-1123, the outer portion (the outer ring portion) of the second elastic element 5-110 is fixedly disposed on a plane 5-1125 of each of the protruding columns 5-113, and the inner portions (the inner ring portions) of the first elastic element 5-106 and the second elastic element 5-110 are respectively connected to the upper and lower sides of the movable assembly 5-MA so that the first movable member 5-1081 to the fourth movable member 5-1084 are suspended in the accommodating space 5-1023.

In this embodiment, the driving module 5-DM may include four driving assemblies (a first driving assembly 5-DA1, a second driving assembly 5-DA2, a third driving assembly 5-DA3, and a fourth driving assembly 5-DA4). The first driving assembly 5-DA1 includes a first driving coil 5-CL1 and a first magnetic element 5-MG1, and the second driving assembly 5-DA2 includes a second driving coil 5-CL2 and a second magnetic element 5-MG2, the third driving assembly 5-DA3 includes a third driving coil 5-CL3 and a third magnetic element 5-MG3, and the fourth driving assembly 5-DA4 includes a fourth driving coil 5-CL4 and a fourth magnetic element 5-MG4.

In this embodiment, each magnetic element has a magnetic surface. For example, as shown in FIG. 2, the first magnetic element 5-MG1 and the second magnetic element 5-MG2 respectively have a first magnetic surface 5-MS1 and a second magnetic surface 5-MS2, the first magnetic surface 5-MS1 faces the first driving coil 5-CL1, the second magnetic surface 5-MS2 faces the second driving coil 5-CL2, and the first magnetic surface 5-MS1 and the second magnetic surface 5-MS2 face different directions.

In this embodiment, as shown in FIG. 2, the frame 5-104 has a plurality of grooves 5-1041 and a central opening 5-1043. In this embodiment, the frame 5-104 has four grooves 5-1041 configured to receive the four magnetic elements, but the number of the grooves 5-1041 and the magnetic elements is not limited to this embodiment. The central opening 5-1043 is configured to accommodate the first driving coil 5-CL1 to the fourth driving coil 5-CL4 and the first movable member 5-1081 to the fourth movable member 5-1084.

In this embodiment, the first driving coil 5-CL1 to the fourth driving coil 5-CL4 may be winding coils, which are respectively disposed on the first movable member 5-1081 to the fourth movable member 5-1084, and when the first driving coil 5-CL1 to the fourth driving coil 5-CL4 are provided with electricity, they can respectively act with the first magnetic element 5-MG1 to the fourth magnetic element 5-MG4 to generate an electromagnetic driving force to drive at least one of the first movable member 5-1081 to the fourth movable member 5-1084 to move relative to the base 5-112 and the frame 5-104 along the optical axis 5-O (the Z-axis) so as to perform functions of auto focusing or optical image stabilization.

The driving assembly of the driving module 5-DM can actuate individually or cooperatively. For example, the first driving assembly 5-DA1 is configured to drive the first movable member 5-1081 to move relative to the fixed assembly 5-FA, and the second driving assembly 5-DA2 is configured to drive the second movable member 5-1082 to move relative to the fixed assembly 5-FA and the first movable member 5-1081, and so on.

Furthermore, as shown in FIG. 2, in this embodiment, the fixed assembly 5-FA may further include at least one circuit member 5-170 configured to be electrically connected to the driving module 5-DM through the first elastic element 5-106 or the second elastic element 5-110. The circuit member 5-170 may be implemented by insert molding technology, but it is not limited thereto. In addition, the circuit member 5-170, the first elastic element 5-106, and the second elastic element 5-110 may constitute a circuit assembly.

Figure 4:
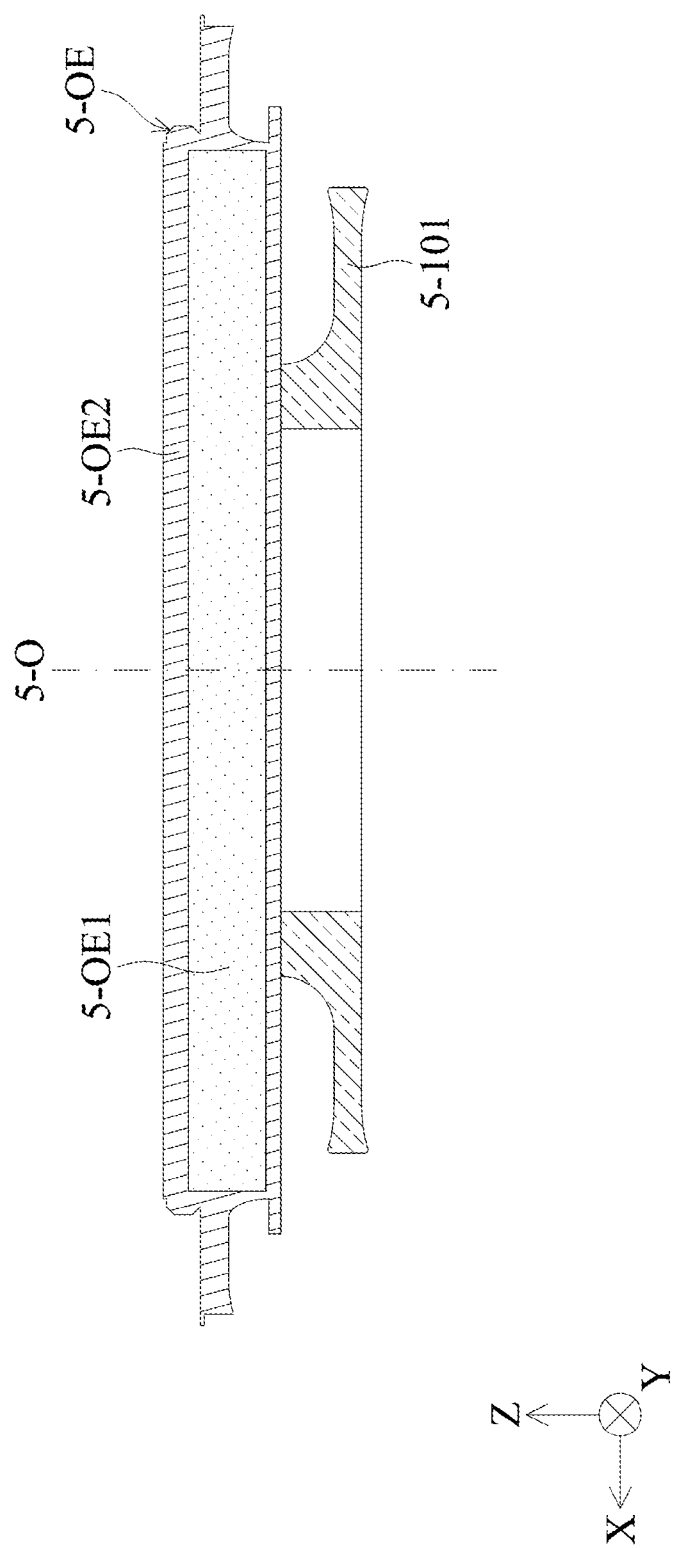
FIG. 4 is a schematic diagram illustrating that the first optical element 5-OE is not pushed by the deforming member 5-101 according to an embodiment of the present disclosure.
Figure 5:
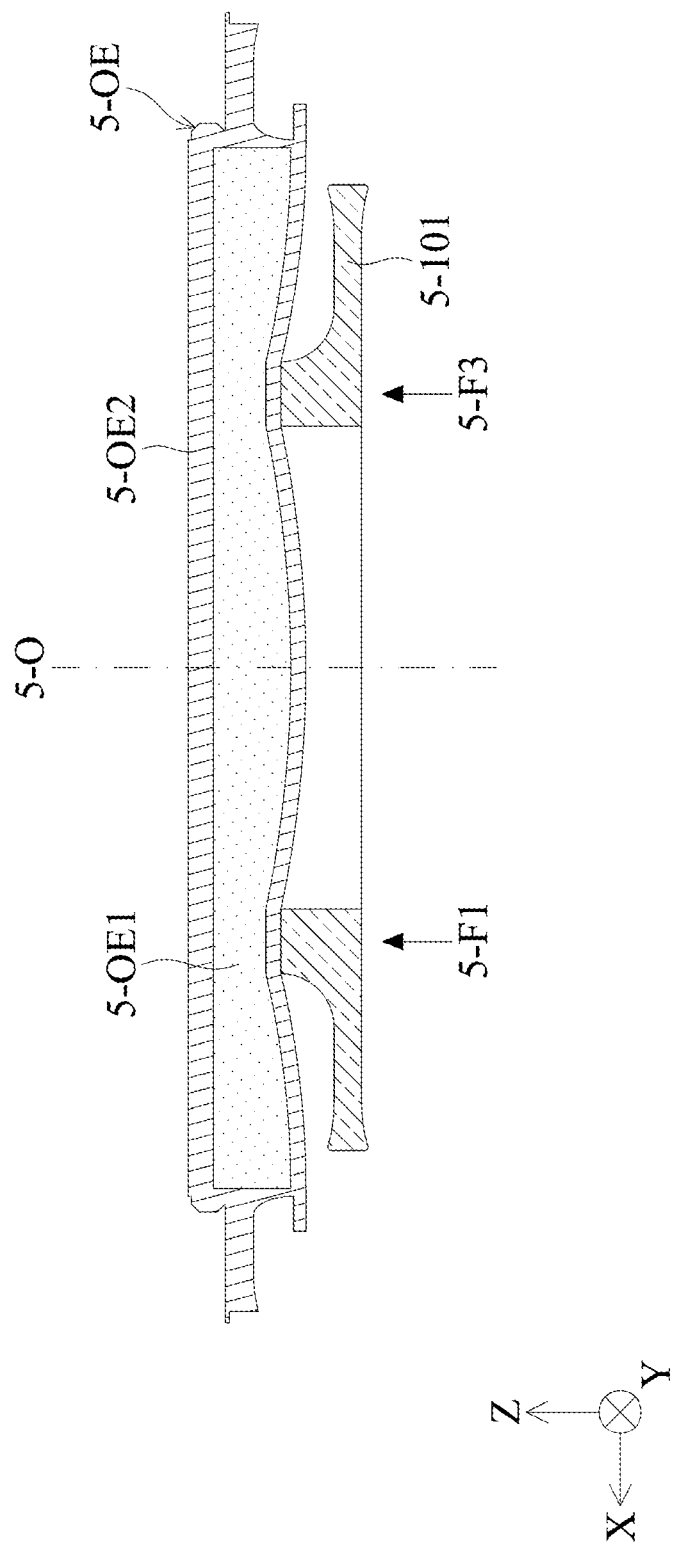
FIG. 5 and FIG. 6 are schematic diagrams of the first optical element 5-OE after being pushed by the deforming member 5-101 according to an embodiment of the present disclosure.
Figure 6:
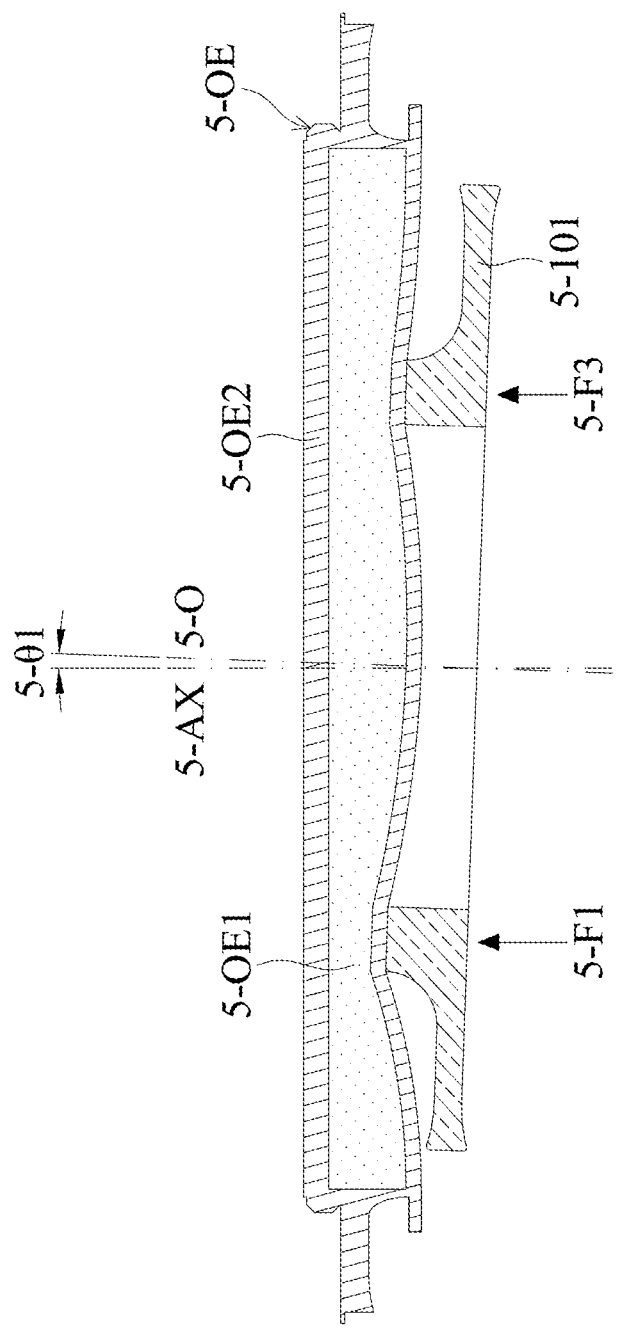

Next, please refer to FIG. 4 to FIG. 6. FIG. 4 is a schematic diagram illustrating that the first optical element 5-OF is not pushed by the deforming member 5-101 according to an embodiment of the present disclosure, and FIG. 5 and FIG. 6 are schematic diagrams of the first optical element 5-OE after being pushed by the deforming member 5-101 according to an embodiment of the present disclosure. As shown in FIG. 4, the first optical element 5-OE may be a liquid lens, including a liquid lens element 5-OE1 and a fixed member 5-OE2. The liquid lens element 5-OH is disposed within of the fixed member 5-OE2 having a hollow structure that protects and supports the liquid lens element 5-OE1. The deforming member 5-101 is disposed under the liquid lens element 5-OE1 and the fixed member 5-OE2. The bottom of the fixed member 5-OE2 may be a thin film, so that the deforming member 5-101 may be used for changing the shape of the liquid lens element 5-OE1.

FIG. 4 shows that the liquid lens element 5-OE1 is not deformed and the deforming member 5-101 is in an initial position, and the liquid lens element 5-OE1 has an optical axis 5-O. When the driving module 5-DM drives the movable assembly 5-MA to move, for example, applying a driving current to the driving coils of the driving module 5-DM, a magnetic force is generated between the driving coils and the corresponding magnetic elements, so that the movable assembly 5-MA is driven to move through the magnetic force and to force the deforming member 5-101 though the connecting assembly 5-CA to press the lower side of the liquid lens element 5-OE1. Therefore the liquid lens element 5-OE1 is deformed.

As shown in FIG. 2 and FIG. 5 when the first driving assembly 5-DA1 and the third driving assembly 5-DA3 of the driving module 5-DM provide pushing forces 5-F1, 5-F3 of the same magnitude, the deforming member 5-101 translates along the optical axis 5-O. At this time, the lens curvature of the liquid lens element 5-OE1 is changed from the curvature of the liquid lens element 5-OE1 in FIG. 4. That is, the shape of the liquid lens element 5-OE1 is changed. Therefore, the optical properties of the liquid lens element 5-OE1 can be changed, thereby achieving an optical zoom, focus or shock-proofing effect.

Similarly, referring to FIG. 6, when the driving module 5-DM drives the deforming member 5-101 with a tilted movement, as illustrated in FIG. 6, the deforming member 5-101 obliquely moves and provides an unequal amount of pushing forces 5-F1 and 5-F3 to two different sides of the liquid lens element 5-OE1, so that the optical axis 5-O of the liquid lens element 5-OE1 is rotated and is deviated from the main axis 5-AX. That is, there is an angle 5-θ1 formed between them. Therefore, the optical properties of the liquid lens element 5-OE1 are changed, and the optical zoom, focusing or shock-proofing effect can be accomplished.

Figure 7:
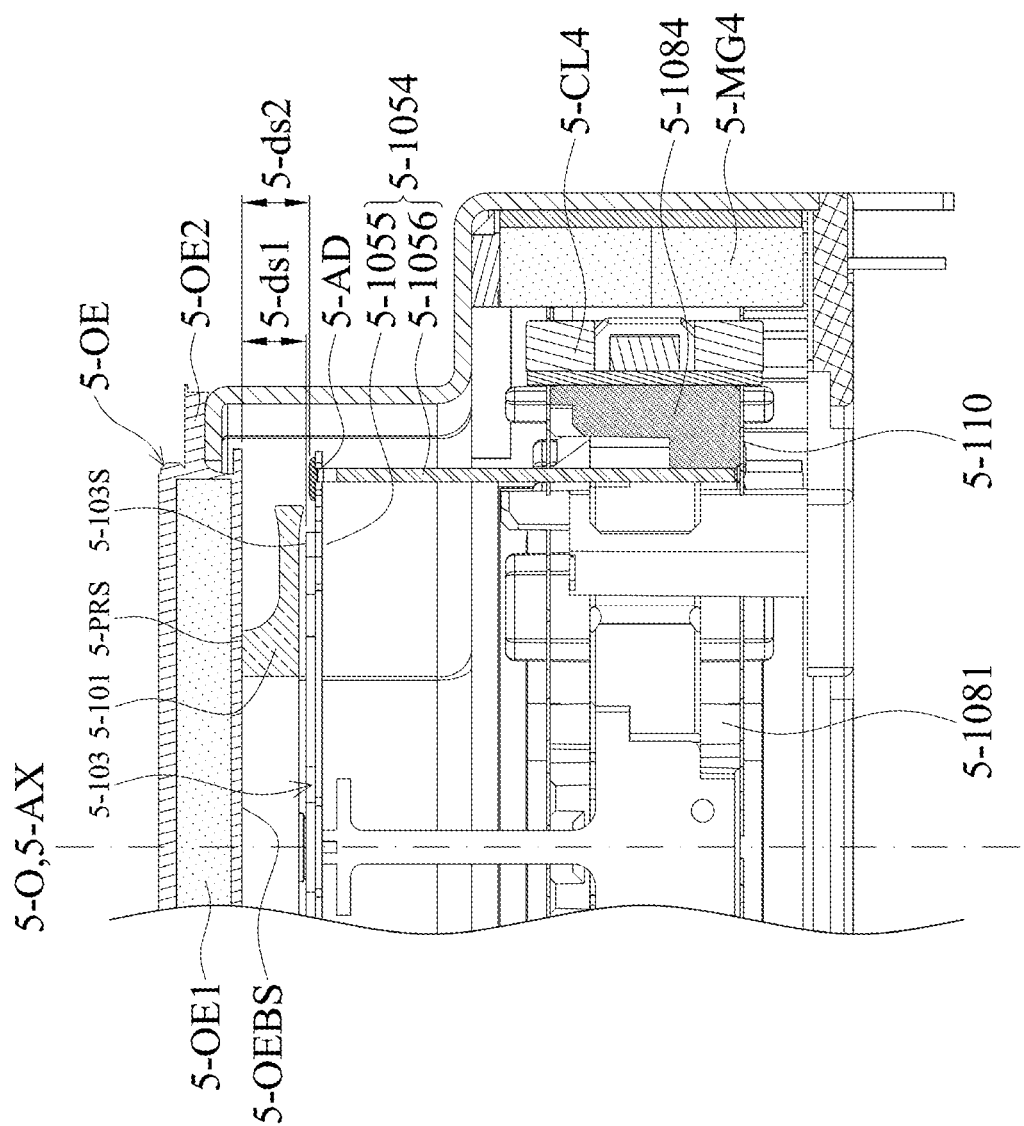
FIG. 7 is an enlarged schematic diagram of the optical system 5-100 in FIG. 3 according to an embodiment of the present disclosure.

Please refer to FIG. 7, which is an enlarged schematic diagram of the optical system 5-100 in FIG. 3 according to an embodiment of the present disclosure. As shown in FIG. 7, the fourth connecting member 5-1054 has an elastic portion 5-1055 and a rigid portion 5-1056. The elastic portion 5-1055 is not parallel to the main axis 5-AX, for example, perpendicular to the main axis 5-AX. The rigid portion 5-1056 is connected between the elastic portion 5-1055 and the fourth movable member 5-1084 of the movable assembly 5-MA. It should be notated that a distance 5-ds1 between the movable element surface 5-103S (the top surface) of the movable element 5-103 and the first optical element 5-GE along the main axis 5-AX is less than a distance 5-ds2 between the adhesive member 5-AD and the first optical element 5-OE. Based on the above design, when the movable assembly 5-MA moves, it can prevent the rigid portion 5-1056 and the adhesive member 5-AD from contacting the first optical element 5-OE to cause damage to the first optical element 5-OE.

Figure 8:
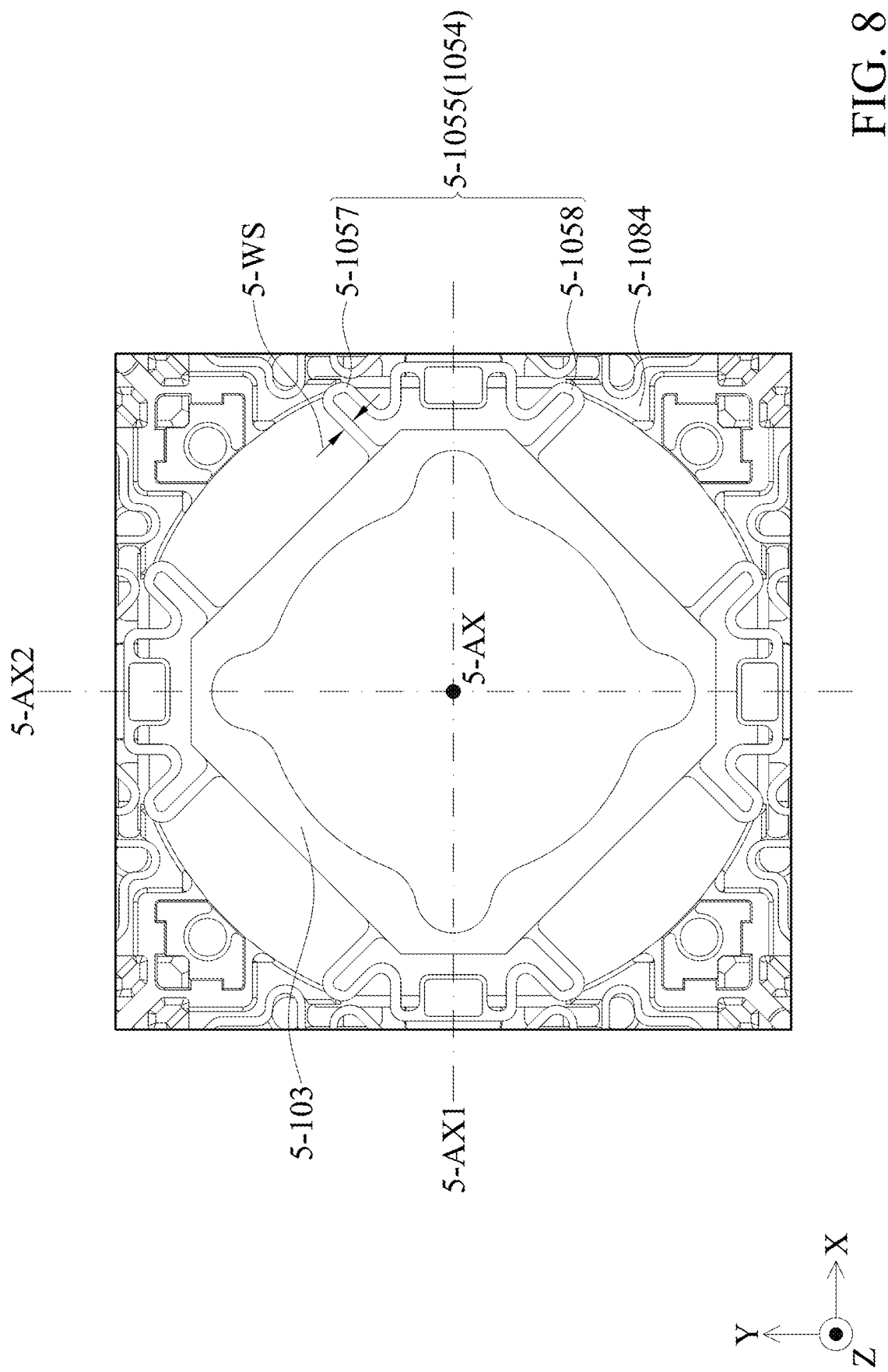
FIG. 8 is a top view of a partial structure of the optical system 5-100 according to an embodiment of the present disclosure.

Please refer to FIG. 8, which is a top view of a partial structure of the optical system 5-100 according to an embodiment of the present disclosure. As shown in FIG. 8, when viewed along the main axis 5-AX, the elastic portion of each connecting member extends outward from the movable element 5-103. For example, the elastic portion 5-1055 of the fourth connecting member 5-1054 extends outward from the movable element 5-103. In addition, in this embodiment, the connecting assembly 5-CA includes four connecting members, and when viewed along the main axis 5-AX, the elastic portions of these connecting members are mirror-symmetric with respect to a first traverse axis 5-AX1 or a second traverse axis 5-AX2.

Specifically, the elastic portion of each connecting member may be formed by a string, extending along multiple directions which are perpendicular to the main axis 5-AX, that is, extending along the XY plane. In addition, as shown in FIG. 8, when viewed along the main axis 5-AX, the string of the elastic portion 5-1055 of the fourth connecting member 5-1054 has a fixed width 5-WS, and both ends of the string are connected to the movable element 5-103.

In this embodiment, the string of the elastic portion 5-1055 may have two cantilever. For example, the string of the elastic portion 5-1055 of the fourth connecting member 5-1054 may have a first cantilever 5-1057 and a second cantilever 5-1058, and the first cantilever 5-1057 and the second cantilever 5-1058 are symmetrical with respect to the first traverse axis 5-AX1.

Based on the design of the string of the elastic portion, the stability of the movable assembly 5-MA to drive the movable element 5-103 via the connecting assembly 5-CA can be increased. For example, when the fourth movable member 5-1084 moves along the main axis 5-AX, the movable element 5-103 is driven to move only along the main axis 5-AX and not to move along the first traverse axis 5-AX1 or the second traverse axis 5-AX2.

Figure 9:
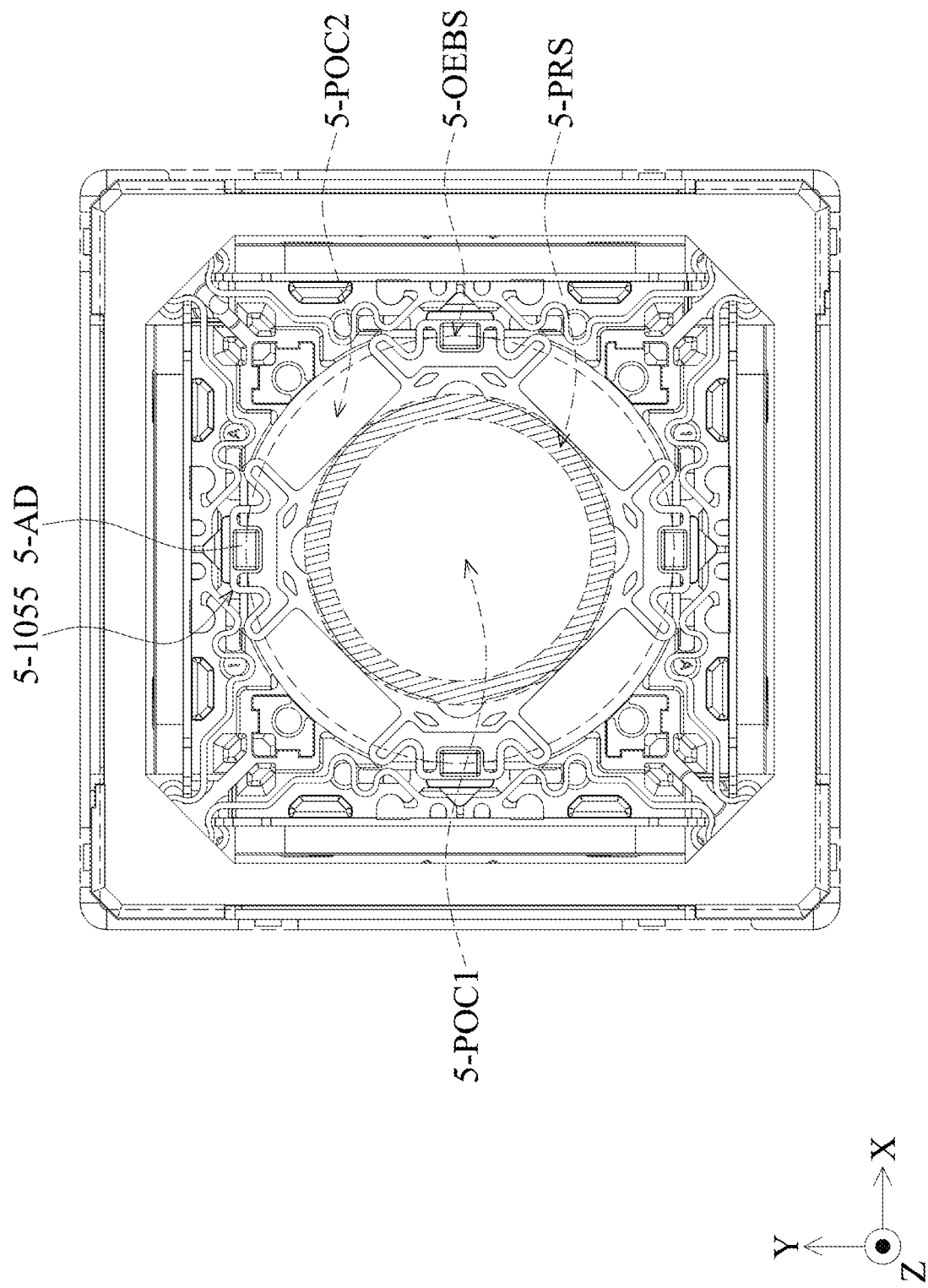
FIG. 9 is a top view of a partial structure of the optical system 5-100 according to an embodiment of the present disclosure.

Please refer to FIG. 7 and FIG. 9. FIG. 9 is a top view of a partial structure of the optical system 5-100 according to an embodiment of the present disclosure. When viewed along the main axis 5-AX, a surface 5-OEBS of the first optical element 5-OE partially overlaps at least one portion of the string. The surface 5-OEBS may be the portion of projection of the liquid lens element 5-OE1 on the bottom surface of the fixed member 5-OE2 along the optical axis 5-O in FIG. 7.

As shown in FIG. 9, the surface 5-OEBS includes a first portion 5-POC1, a second portion 5-POC2, and a pressed surface 5-PRS. The pressed surface 5-PRS may be an area where the deforming member 5-101 contacts the bottom surface of the fixed member 5-OE2 in FIG. 7, and in this embodiment, the pressed surface 5-PRS is an annular area.

In addition, the first portion 5-POC1 is located in the inner side of the pressed surface 5-PRS, the second portion 5-POC2 is located outside the pressed surface 5-PRS, and the string of the elastic portion 5-1055 of each connecting member partially overlaps at least one portion of the second portion 5-POC2. Moreover, in this embodiment, the second portion 5-POC2 also partially overlaps the adhesive member 5-AD, but it is not limited thereto. Ili other embodiments, the second portion 5-POC2 may not overlap the adhesive member 5-AD.

Figure 10:
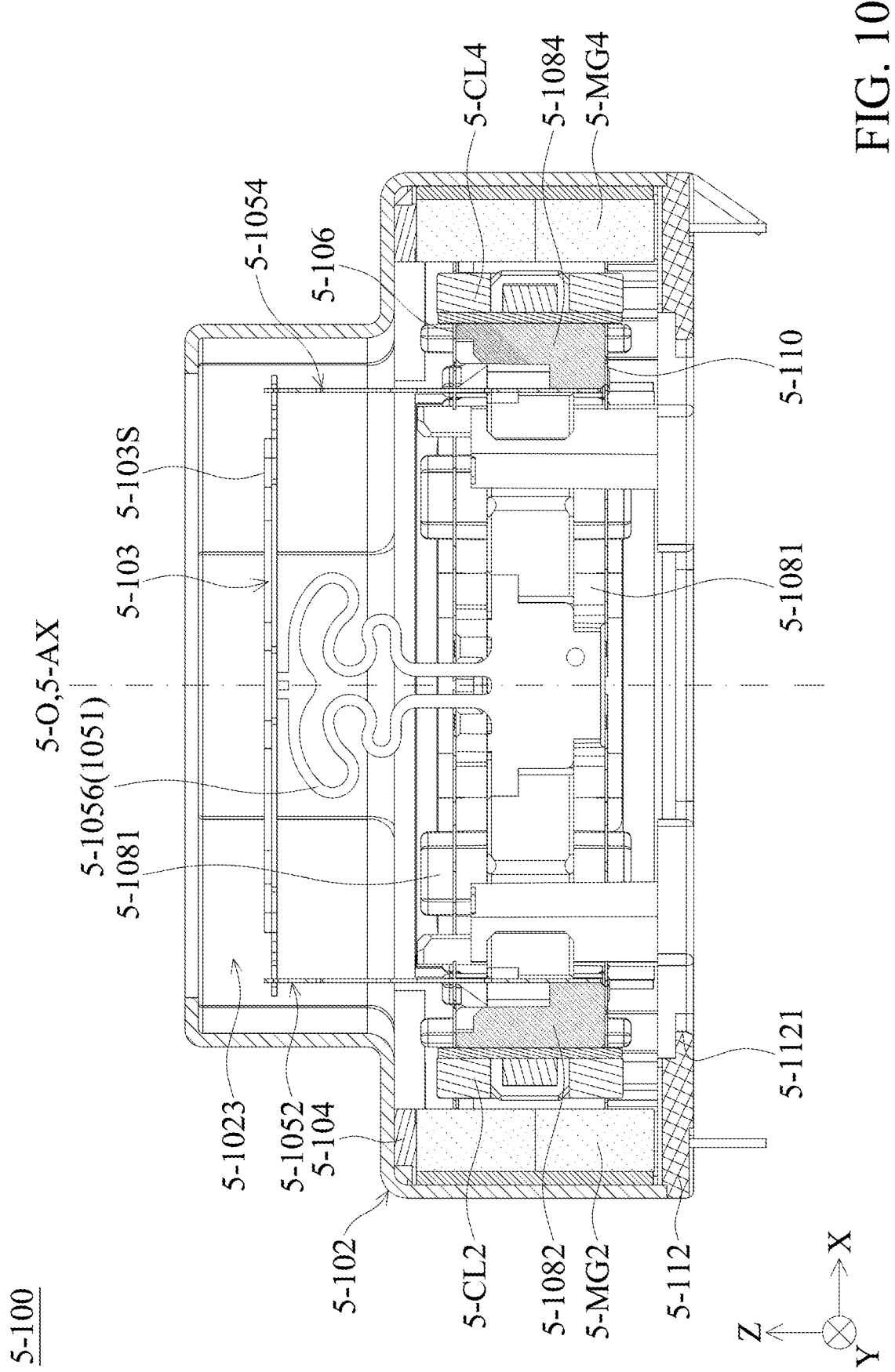
FIG. 10 is a cross-sectional view of the optical system 5-100 according to another embodiment of the present disclosure.

Please refer to FIG. 10, which is a cross-sectional view of the optical system 5-100 according to another embodiment of the present disclosure. This embodiment is similar to the previous embodiment, and their difference is that the rigid portion 5-1056 in this embodiment may be composed of two strings, and the two strings are mirror-symmetric with respect to the main axis 5-AX. Based on the design of the rigid portion 5-1056 in this embodiment, the rigid portion 5-1056 can be prevented from being bent along the XY plane when the movable member (such as the first movable member 5-1081) moves along the main axis 5-AX, and the problem that the rigid portion 5-1056 is easily broken can also be prevented.

Figure 11:
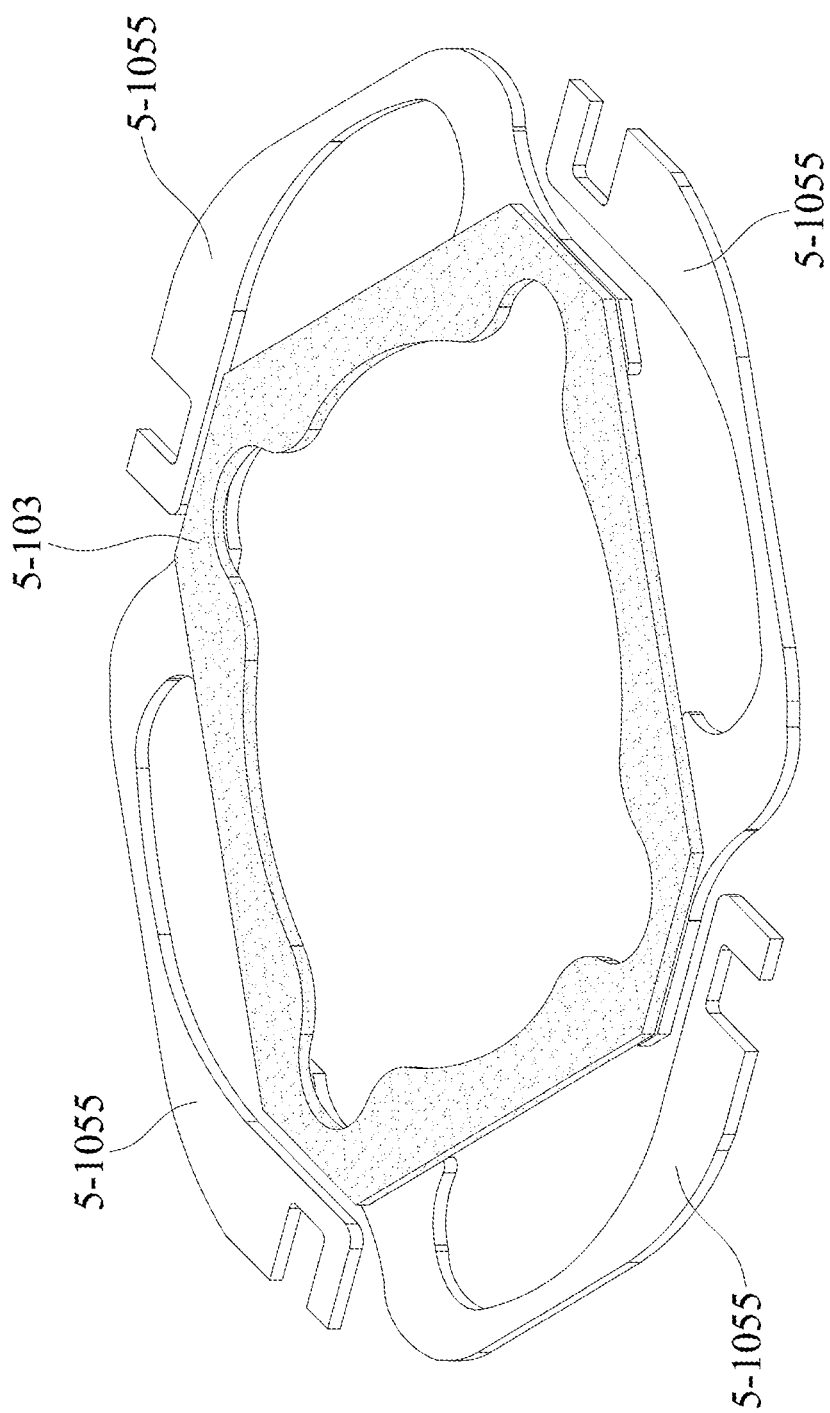
FIG. 11 is a schematic diagram of the movable element 5-103 and several elastic portions 5-1055 after assembly according to another embodiment of the present disclosure.
Figure 12:
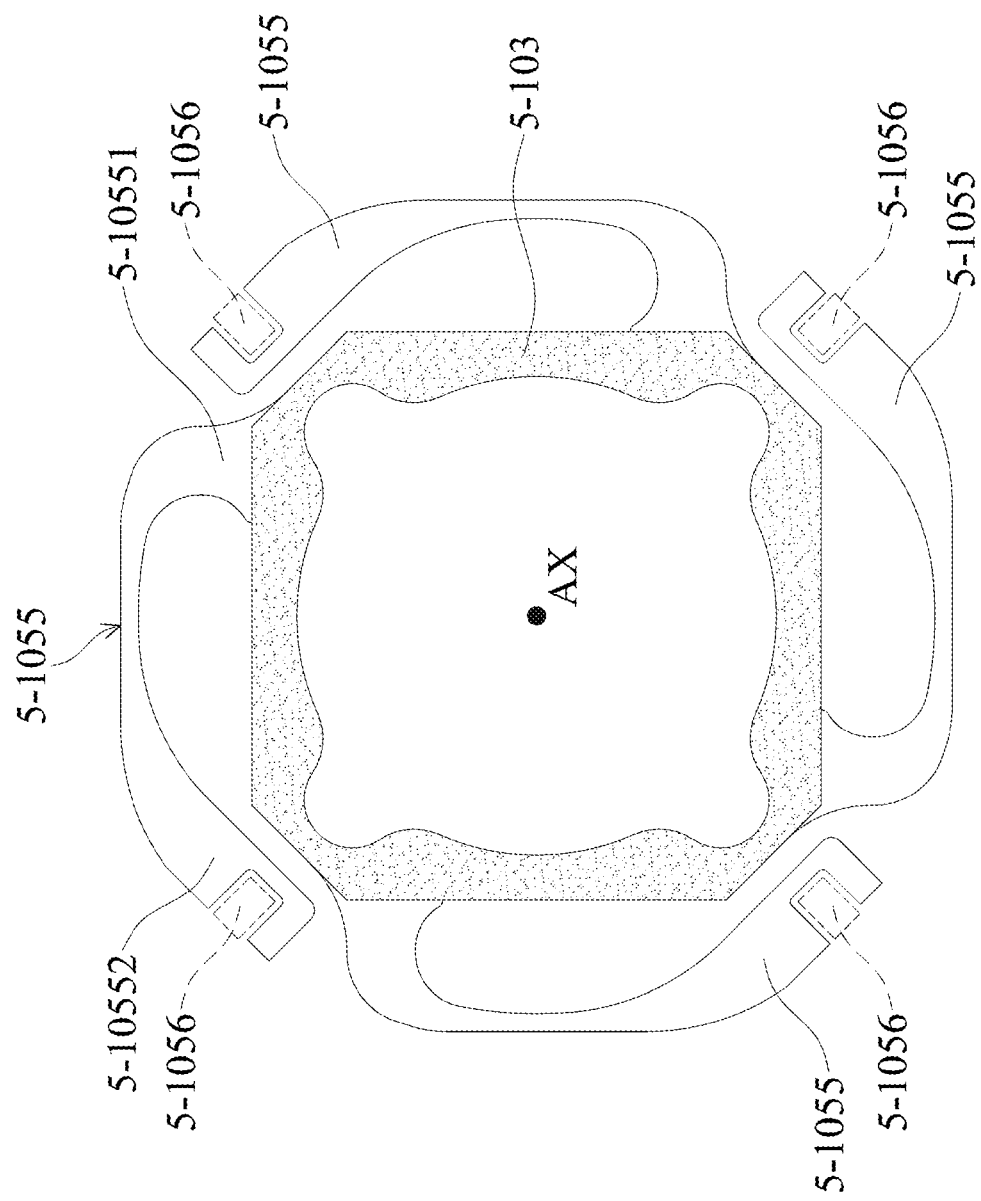
FIG. 12 is a top view of the movable element 5-103 and several elastic portions 5-1055 after assembly according to another embodiment of the present disclosure.

Please refer to FIG. 11 and FIG. 12. FIG. 11 is a schematic diagram of the movable element 5-103 and several elastic portions 5-1055 after assembly according to another embodiment of the present disclosure, and FIG. 12 is a top view of the movable element 5-103 and several elastic portions 5-1055 after assembly according to another embodiment of the present disclosure. In this embodiment, each elastic portion 5-1055 is composed of a single string, and the string has a non-uniform width. Based on the design of the elastic portion 5-1055, the problem of damage to the elastic portion 5-1055 caused by stress concentration can be prevented.

As shown in FIG. 12, when viewed along the main axis 5-AX, each string has a first end 5-10551 and a second end 5-10552. The first end 5-10551 is connected to the movable element 5-103, and the second end 5-10552 is connected to the corresponding rigid portion 5-1056, for example, via the adhesive member 5-AD. In addition, these connecting members (including the elastic portion 5-1055 and the rigid portion 5-1056) are rotationally symmetric with respect to the main axis 5-AX.

Figure 13:
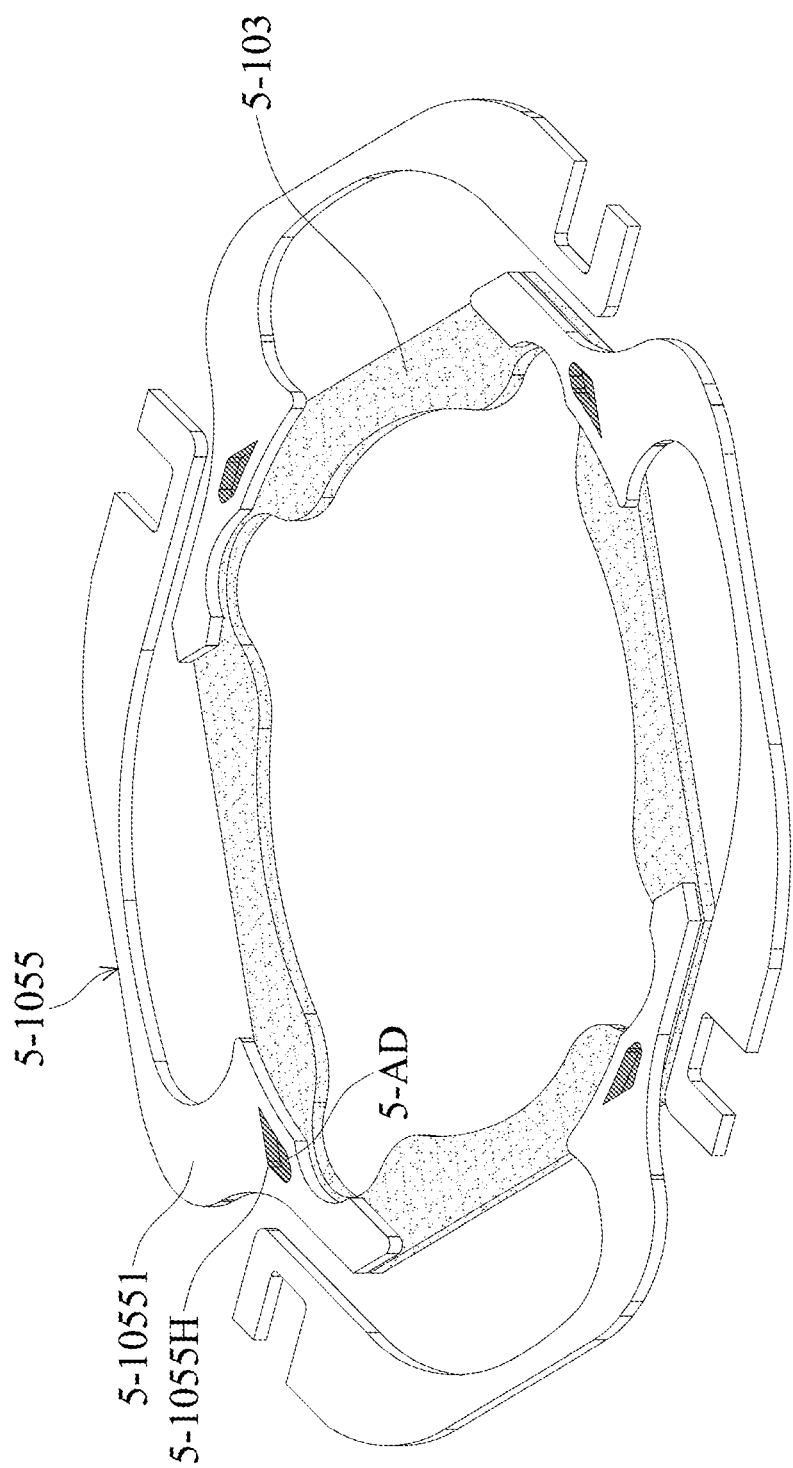
FIG. 13 is a schematic diagram of the movable element 5-103 and several elastic portions 5-1055 after assembly in another view according to another embodiment of the present disclosure.

Please refer to FIG. 13, which is a schematic diagram of the movable element 5-103 and several elastic portions 5-1055 after assembly in another view according to another embodiment of the present disclosure. In this embodiment, the string can be connected to the movable element 5-103 by an adhesive member 5-AD. Specifically, as shown in FIG. 13, an opening 5-1055H may be formed on the first end 5-10551, and the adhesive member 5-AD may be disposed within the opening 5-10551-1, so that the elastic portion 5-1055 is fixed to the movable element 5-103.

In this embodiment, the elastic portion 5-1055 and the movable element 5-103 can be made of a metal material, in addition, in other embodiments, the movable element 5-103 and these elastic portions 5-1055 (string) may be integrally formed in one piece, for example, using a stamping technique. Based on the design of one-piece, the convenience of assembly without positioning and the increase of strength can be achieved.

Figure 14:
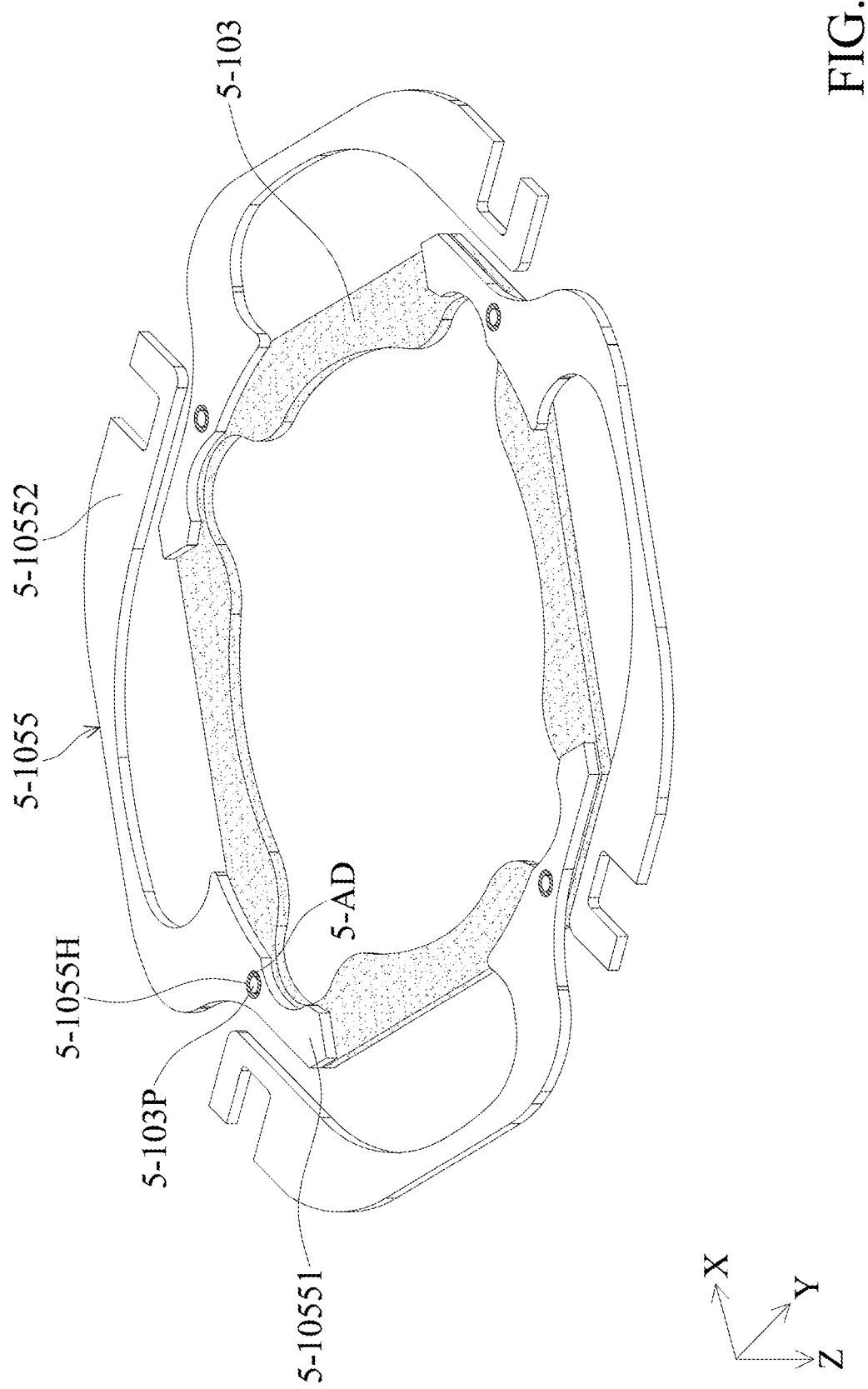
FIG. 14 is a schematic diagram of the movable element 5-103 and several elastic portions 5-1055 after assembly in another view according to another embodiment of the present disclosure.

Please refer to FIG. 14, which is a schematic diagram of the movable element 5-103 and several elastic portions 5-1055 after assembly in another view according to another embodiment of the present disclosure. In this embodiment, the movable element 5-103 is made of plastic material, and at least one positioning portion 5-103P may be formed on the movable element 5-103. The positioning portion 5-103P corresponds to the opening 5-105511 and is configured to position the first end 5-10551 of the string. In addition, the adhesive member 5-AD may be further disposed in the opening 5-1055H so that the first end 5-10551 is fixed to the movable element 5-103. Based on the design of the positioning portion 5-103P, the convenience of assembly and the accuracy of positioning can be increased.

Figure 15:
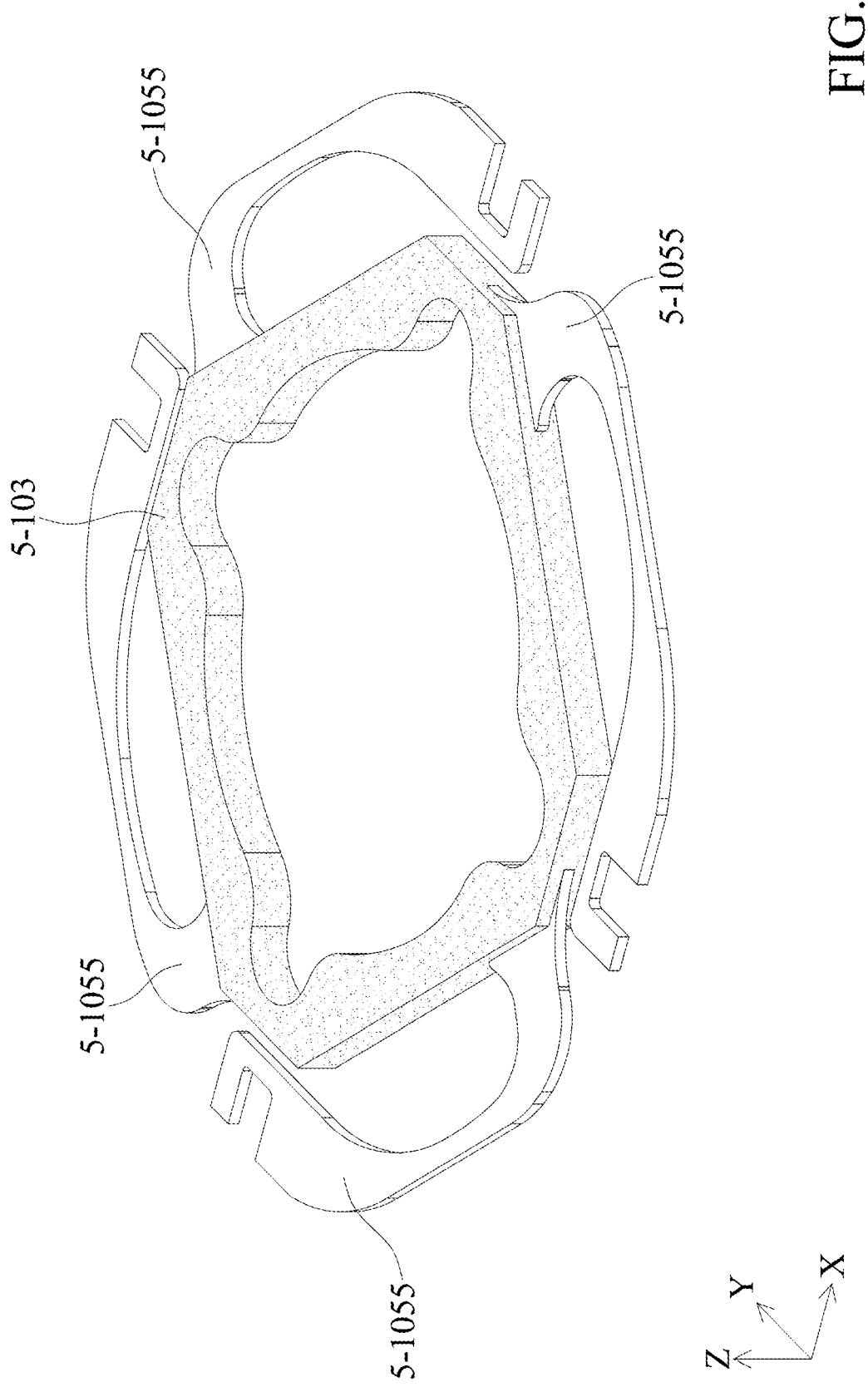
FIG. 15 is a schematic diagram of the movable element 5-103 and several elastic portions 5-1055 according to another embodiment of the present disclosure.

Please refer to FIG. 15, which is a schematic diagram of the movable element 5-103 and several elastic portions 5-1055 according to another embodiment of the present disclosure. In this embodiment, the movable element 5-103 is made of plastic material, and these elastic portions 5-1055 (the strings) are made of metal material and are embedded in the movable element 5-103 by insert molding technology. Based on this design, the assembly convenience of the optical system 5-100 can be improved.

The present disclosure provides an optical system having a first optical element 5-OE, a deforming member 5-101, a movable element 5-103, a fixed assembly 5-FA, a connecting assembly 5-CA, a movable assembly 5-MA, and a driving module 5-DM. The movable element 5-103 is configured to be connected to the first optical element 5-OE through the deforming member 5-101, and the movable assembly 5-MA is connected to the movable element 5-103 through the connecting assembly 5-CA. When driving module 5-DM is configured to drive movable assembly 5-MA to move relative to fixed assembly 5-FA, the movable element 5-103 can be moved to drive the deforming member 5-101 to push the bottom of first optical element 5-OE, thereby changing the optical properties of the liquid lens element 5-OE1.

In addition, in some embodiments, the string of the elastic portion 5-1055 can be designed to include two cantilever, and based on the design of this string, the stability of the movable assembly 5-MA to drive the movable element 5-103 via the connecting assembly 5-CA can be increased.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical system, comprising:
   a fixed assembly, having a main axis;
   a movable assembly, movably relative to the fixed assembly;
   a movable element, configured to be connected to a first optical element;
   a connecting assembly, wherein the movable assembly is movably connected to the movable element via the connecting assembly; and
   a driving module, configured to drive the movable assembly to move relative to the fixed assembly;
   wherein when viewed in any direction perpendicular to the main axis, the movable element does not overlap the driving module;

wherein the driving module drives the movable assembly to move relative to the fixed assembly so as to drive the movable element;

wherein the connecting assembly includes a connecting member, the movable assembly is connected to the movable element by an elastic portion of the connecting member, and the connecting member further has a rigid portion connected to the elastic portion by an adhesive member;

wherein a distance between a top surface of the movable element and the first optical element along the main axis is less than a distance between the adhesive member and the first optical element along the main axis.

2. The optical system as claimed in claim 1, wherein when viewed along the main axis, the connecting member extends outward from the movable element.

3. The optical system as claimed in claim 1, wherein the connecting assembly includes a plurality of connecting members, and when viewed along the main axis, the connecting members are mirror-symmetric with respect to a first traverse axis or a second traverse axis.

4. The optical system as claimed in claim 3, wherein each connecting member includes at least one string, extending along multiple directions which are perpendicular to the main axis.

5. The optical system as claimed in claim 4, wherein when viewed along the main axis, both ends of the string are connected to the movable element.

6. The optical system as claimed in claim 4, wherein the string includes a first cantilever and a second cantilever, and the first cantilever and the second cantilever are symmetrical with respect to the first traverse axis.

7. The optical system as claimed in claim 4, wherein when viewed along the main axis, the string has a fixed width.

8. The optical system as claimed in claim 4, wherein when viewed along the main axis, a surface of the first optical element partially overlaps at least one portion of the string.

9. The optical system as claimed in claim 8, wherein when viewed along the main axis, a first portion of the surface is located in an inner side of a pressured surface of the first optical element, a second portion of the surface is located outside the pressured surface of the first optical element, and the string partially overlaps at least one portion of the second portion.

10. The optical system as claimed in claim 4, wherein when viewed along the main axis, the string has a non-uniform width.

11. The optical system as claimed in claim 4, wherein the string has a first end and a second end, and when viewed along the main axis, the first end is connected to the movable element, and the second end is connected to the rigid portion.

12. The optical system as claimed in claim 11, wherein when viewed along the main axis, the connecting members are rotationally symmetric with respect to the main axis.

13. The optical system as claimed in claim 11, wherein the string is connected to the movable element by an adhesive member.

14. The optical system as claimed in claim 11, wherein the string and the movable element are made of metal material, and the movable element and the string are integrally formed in one piece.

15. The optical system as claimed in claim 11, wherein the movable element is made of plastic material.

16. The optical system as claimed in claim 15, wherein at least one positioning portion is formed on the movable element, and the positioning portion is configured to position the first end of the string.

17. The optical system as claimed in claim 15, wherein the string is made of metal material and is embedded in the movable element by insert molding technology.

18. The optical system as claimed in claim 4, wherein the rigid portion is mirror-symmetric with respect to the main axis.

19. The optical system as claimed in claim 1, wherein the movable element is disposed between the first optical element and the adhesive member along the main axis, and the optical system further includes a deforming member which is connected between the movable element and the first optical element.

* * * * *